United States Patent
Smith et al.

[19]

[11] Patent Number: 6,101,451
[45] Date of Patent: Aug. 8, 2000

[54] WATER MANAGEMENT SYSTEM

[75] Inventors: Wade W. Smith, Branchburg; David A. Saar, Titusville, both of N.J.

[73] Assignee: Water Management Services, Inc., San Diego, Calif.

[21] Appl. No.: 09/027,574

[22] Filed: Feb. 23, 1998

[51] Int. Cl.[7] .................................................. G01F 23/00
[52] U.S. Cl. .......................... 702/55; 702/45; 702/130; 73/53.04; 73/54.07
[58] Field of Search ............................. 702/54, 45, 130, 702/55; 73/861.77, 861.79, 53.04, 54.07; 137/1, 552; 340/870.11, 870.02, 870.05, 870.17

[56] References Cited

U.S. PATENT DOCUMENTS

| | | | |
|---|---|---|---|
| 5,161,563 | 11/1992 | Thompson | 137/1 |
| 5,441,070 | 8/1995 | Thompson | 137/1 |
| 5,721,383 | 2/1998 | Franklin et al. | 73/861.77 |
| 5,838,258 | 11/1998 | Saar | 702/45 |

Primary Examiner—Marc S. Hoff
Assistant Examiner—Hien Vo
Attorney, Agent, or Firm—Spencer T. Smith

[57] ABSTRACT

A system for monitoring the use of water supplied by a pipe to a device that discharges water during use. A meter generates information indicating that water is flowing through the pipe with a measured BTU content and a control receives the information and determines that either the water is flowing through the pipe or that water has stopped flowing through the pipe. An event counter counts events defined by the flow of water through the pipe followed by the stoppage of water flow in the pipe for at least a predetermined duration of time, and a volume counter counts volumetric flow (gallons of flow, for example) and energy content (therms of energy, for example). Where the meter can be interfered with by attaching a magnet to the meter a tamper signal is also generated. With this data, misoperation of the devices can be indicated.

8 Claims, 6 Drawing Sheets

WATER MANAGEMENT SYSTEM

The present invention comprises a system for monitoring the use of water and water related heat energy in a home or apartment unit.

BACKGROUND OF THE INVENTION

Today there is a great emphasis on conserving water and water related heat energy. Shower heads and faucets may be designed to restrict flow to a maximum flow rate. The toilet may also be designed to use no more than 1.6 gallons per flush. And the temperature of the water outputted by the hot water heating device is being set at lower and lower temperatures.

U.S. patent application Ser. No. 08/972,848 filed Nov. 18, 1997, discloses a system wherein each pipe, which discharges water in an apartment, etc., has a monitor attached thereto to determine the flow of the pipe and the temperature of the water flowing through the pipe. With this information the total volume of water used in the unit and the heat energy added to the water can be calculated. U.S. patent application Ser. No. 08/972,848 discloses a monitor for such application. These applications are incorporated by reference herein.

OBJECT OF THE INVENTION

It is an object of the present invention to provide a system which can enhance the management of the water and energy use.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE PREFERRED EMBODIMENT

Figure 1:
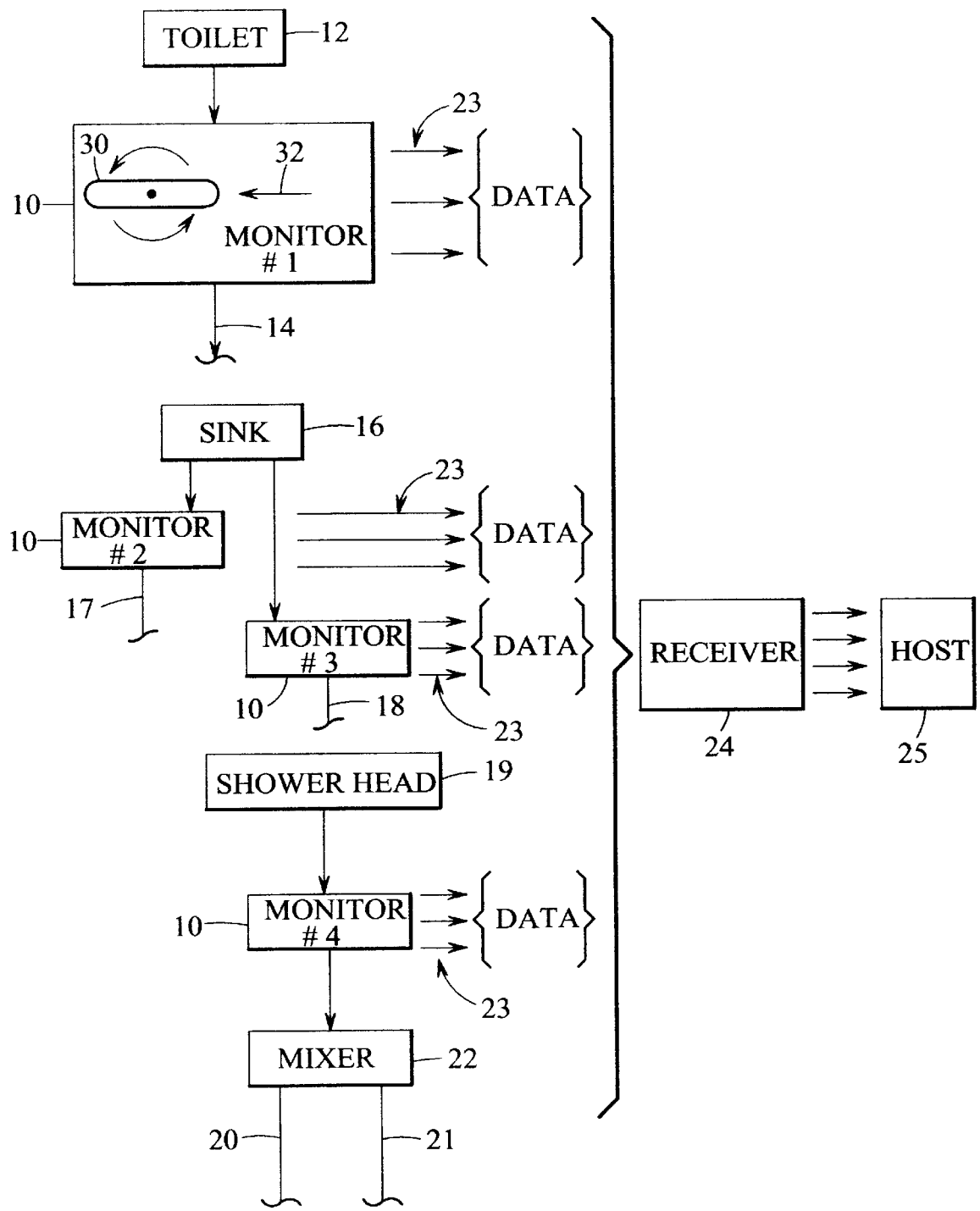
FIG. 1 is a schematic drawing of a number of devices in a unit which discharge water during use, each having a monitor which can sense the flow of water through the pipe and the temperature of that water, and transmit information to a receiver.
Figure 2:
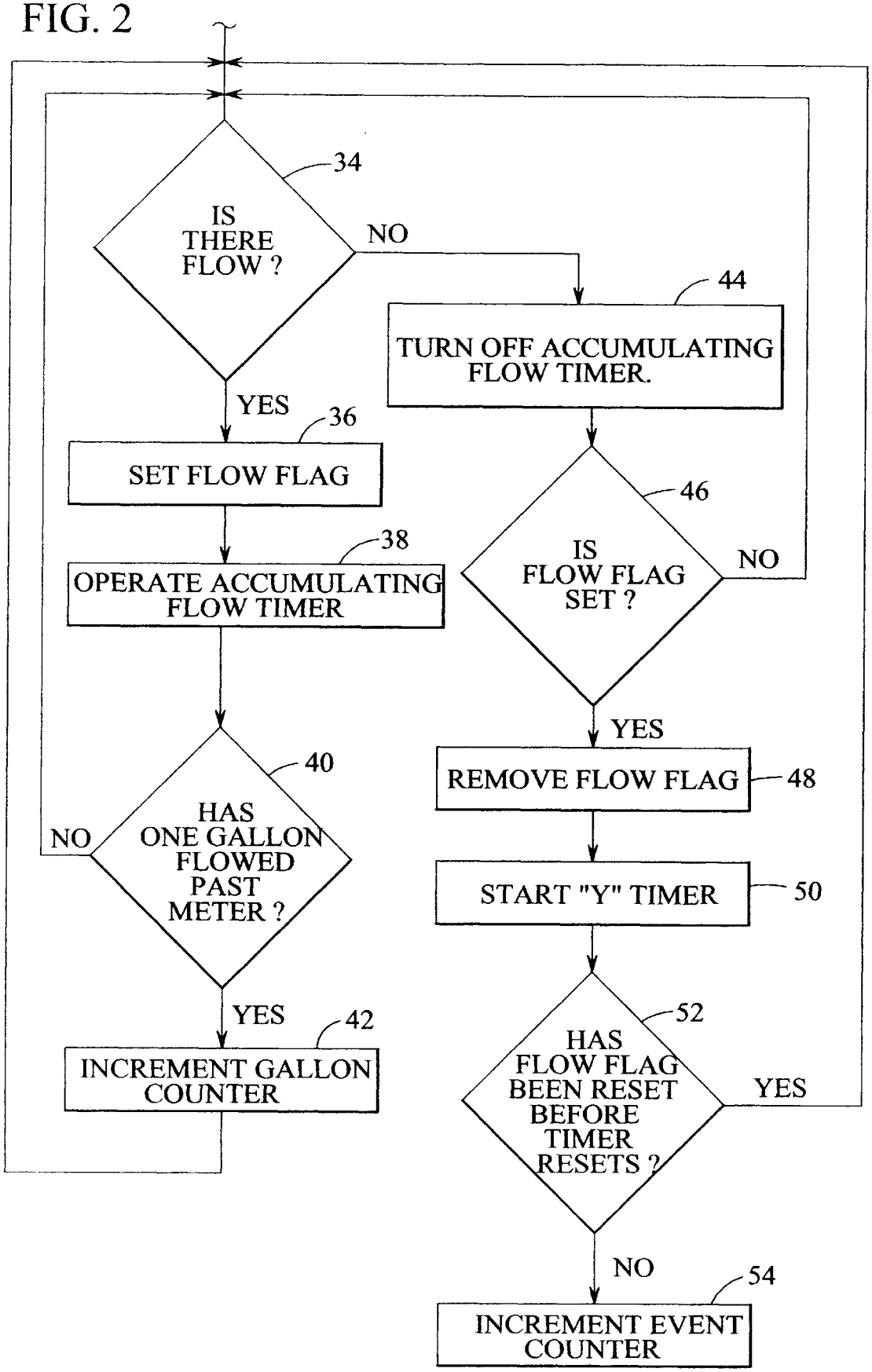
FIG. 2 is a flow chart illustrating the determination of events and total flow for each water consuming device.

FIG. 1 illustrates a number of monitors 10 which will monitor the water used by devices that discharge water during use. One of these devices shown in FIG. 1 is a toilet or water closet 12 which is supplied by a cold water line 14. A second shown device is a sink 16 which is supplied by cold 17 and hot 18 water lines. And a third device is a shower head or tub spout 19 where hot water supplied in a hot water line 20 and cold water supplied in a cold water line 21 are mixed in a mixer 22 prior to monitoring. In a shower application the shower can be independent of the spigot of the tub which means that the shower line will always be full or the shower line can exhaust into the tub through the tub spigot after each use. Both are represented by this drawing. Each monitor will determine information and transmit data 23 at a set frequency (every eight hours, for example) to a remote receiver 24 which will then transmit data to a host device 25 at a set frequency (once a day or week, for example). The monitor, can be of the kind disclosed in the above cited patent application, which includes a rotatable metal target 30 (see monitor no. 1) in the flow stream which is sensed by a sensor 32 which supplies signals to its computer which determines when a defined volume of water (a gallon) has flowed through the pipe. The computer can determine whether flow is occurring (step 34) by virtue of the target being sensed regularly and it can determine that flow has stopped when signals from the sensor stop. To simplify the description, each monitor will be identical. When the computer determines that flow is occurring, the control sets a flow flag (step 36) and operates an accumulating flow timer (total time of flow register) step 38 which will define a running total of the time when water is flowing through the pipe. When the control determines that one gallon of water has flowed through the pipe (step 40) a gallon counter or register will be incremented (step 42).

The monitor will also keep track of fluid events. When there is no flow, the accumulating flow timer will be turned off (step 44) and a determination will be made as to whether or not the flow flag is set (step 46). Should the flow flag not be set, the control program will recycle whereas if the flow flag is set, it will be removed (step 48) and a timer which has a "Y" time period will started (step 50). "Y" could for example be two seconds. The control determines whether or not the water again flows within this "Y" time period (the flow flag is reset) (step 52). If it is reset the cycle is restarted and if the timer times out, an event counter or register will be incremented (step 54). Accordingly an "event" is the water turned on for any time duration followed by being turned off for at least the "Y" time period.

Figure 3:
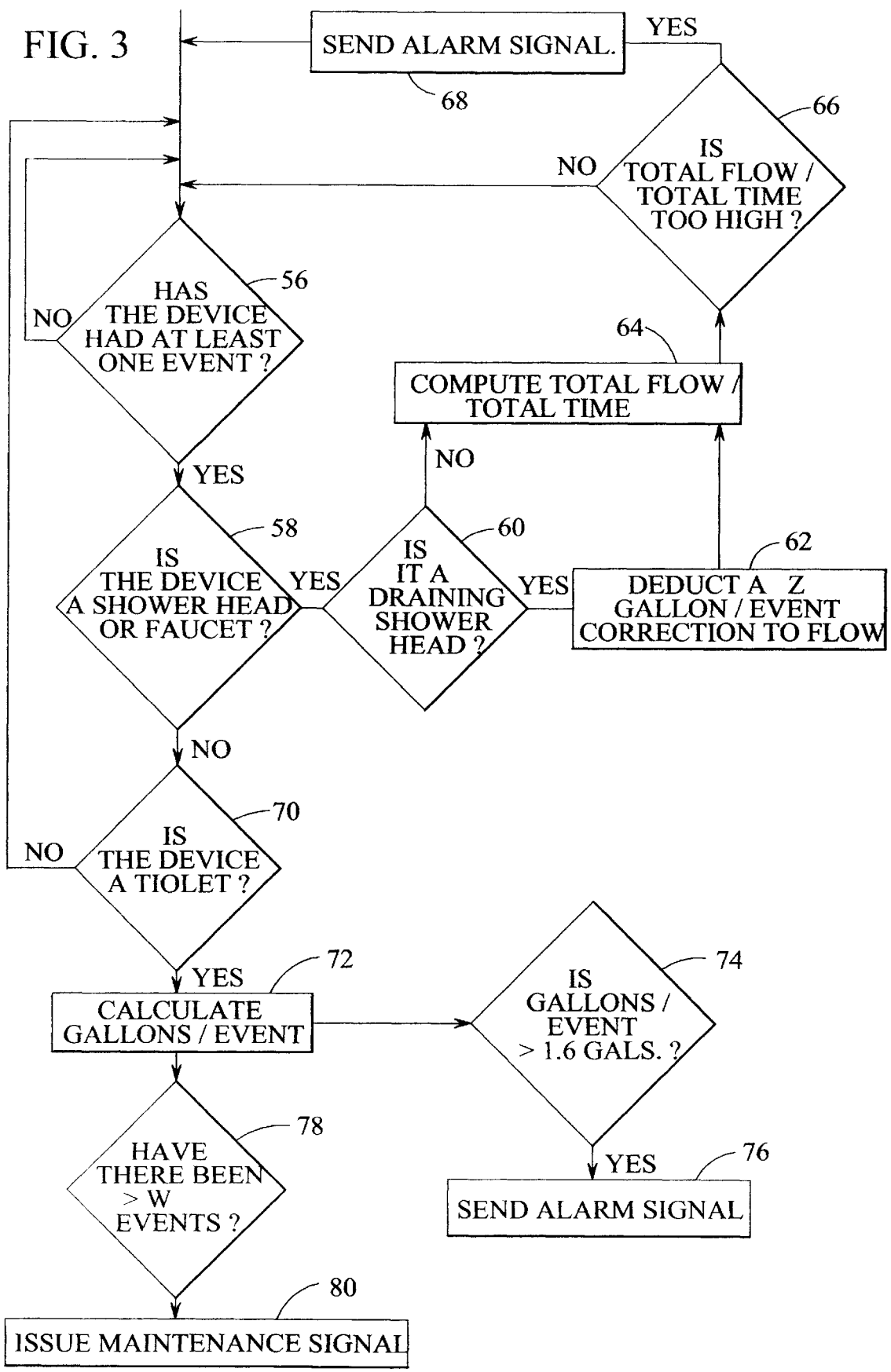
FIG. 3 is a flow chart illustrating the use of event information to monitor the actual flush volume of a toilet and to make flow corrections such as for a shower.

The use of this information is illustrated in FIG. 3, which illustrates an algorithm which can either be in the transmitter, the receiver or the host (this algorithm will be discussed as being operated on by a computer in the host device). The computer determines, at some defined frequency, whether the pipe to which it is connected has had at least one event (step 56). If there has been at least one event, the computer determines whether the device is a faucet or shower head (or tub spigot) from data from the monitor which identifies the device (event 58). Where it is a shower head (or tub spigot), the computer determines from the data whether or not it is a draining shower head (or tub spigot) step 60, i.e., connected to a line which drains after use through the bath spigot. If it is, an empirically defined gallon/event correction "Z" will be defined (step 62) to correct for reverse flow from the shower head or shower valve to the tub spigot upon completion of the shower (bath) and for the flow of air in the normal direction of flow when the device is started up. The total flow/total time, which is the flow rate of the tub, shower or faucet, will be computed (with or without the correction) step 64 and the computed number will be compared to a user defined acceptable flow rate range (the flow of current shower heads and faucets is restricted to an acceptable flow rate) step 66 and where the computed flow rate is not inside this acceptable flow rate range, the flow rate will be too high or too low indicating that the tub shower or faucet requires maintenance (leaks, or is clogged) or has been improperly modified to increase flow. In this case the computer will send an alarm signal (step 68) so that the shower head or faucet can be repaired.

If at step 58, the computer determines that the device is not a shower head or faucet, it will then calculate the gallons/event step 72. If the device is a toilet (step 70), this number will be compared to a user defined flow rate range in gallons/flush for the toilet (step 74) and if the comparison shows the actual gallons per event flow falls out of the acceptable flow rate range thereby indicating that the toilet has been modified or that the toilet is leaking (the flow/event is extremely low), an alarm signal (step will be issued (step 76) so that the toilet can be corrected. Simultaneously, the number of events is compared to a standard "W" (step 78) and if there are more than "W" events, a maintenance signal is issued (step 80) indicating that the toilet is not performing properly.

Figure 4:
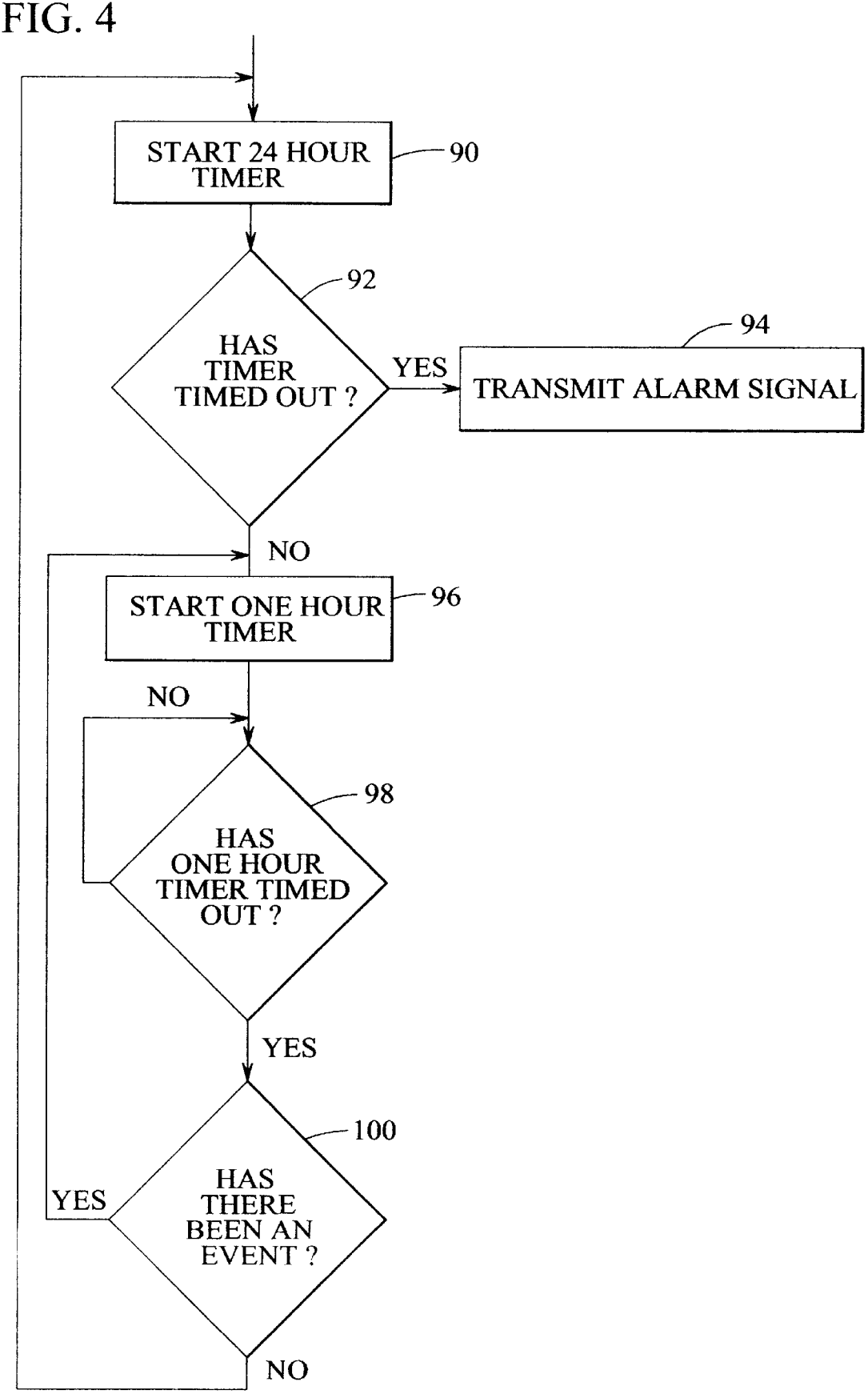
FIG. 4 is a flow chart illustrating the use of event information to identify a maintenance problem.

The computer also has the algorithm illustrated in FIG. 4. Here a 24 hour timer is started (step 90). If this timer times out (step 92), an alarm signal will be transmitted (step 94). If the timer has not timed out, a one hour timer will be started (step 96). When the one hour timer times out (step 96) the computer determines whether an event has occurred (step 100). If no event has occurred, the 24 hour timer is restarted. If an event has occurred, the one hour timer is restarted. If an event has occurred in each of 24 consecutive hours, something is wrong with the device. This would for example indicate that a toilet is not performing properly and that maintenance is required. It should be understood that the duration of the timers and the number of events to indicate a problem can be varied as desired.

Figure 5:
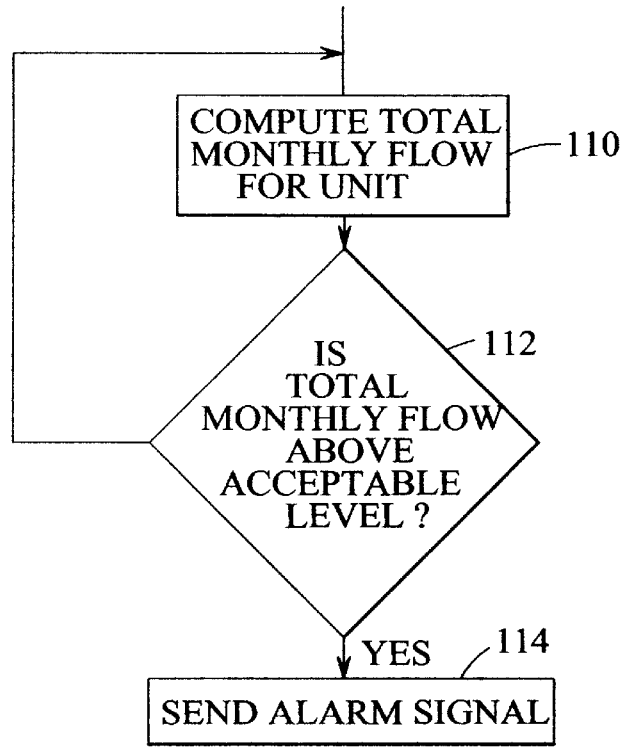
FIG. 5 is a flow chart illustrating the use of total flow information to identify a problem.

The computer can also evaluate the total water flow per month, either on an individual device basis or on a collective device basis (total water used in the dwelling unit). As shown in FIG. 5, a monthly, for example, total of water use is computed for the unit (or a device or devices in the unit) step 110 and if this total is too high or too low when compared to a datum (step 112), an alarm will be issued (step 114). The total volume of the unit as a whole or of a specific device or devices is an indicator of the number of people occupying the dwelling unit. If the unit is intended to be occupied by two people this alarm signal could be designed to indicate that the number of people occupying the unit, is in violation of the terms of the lease. Additionally, this data could indicate the unit is unoccupied or not occupied during the day.

Figure 6:
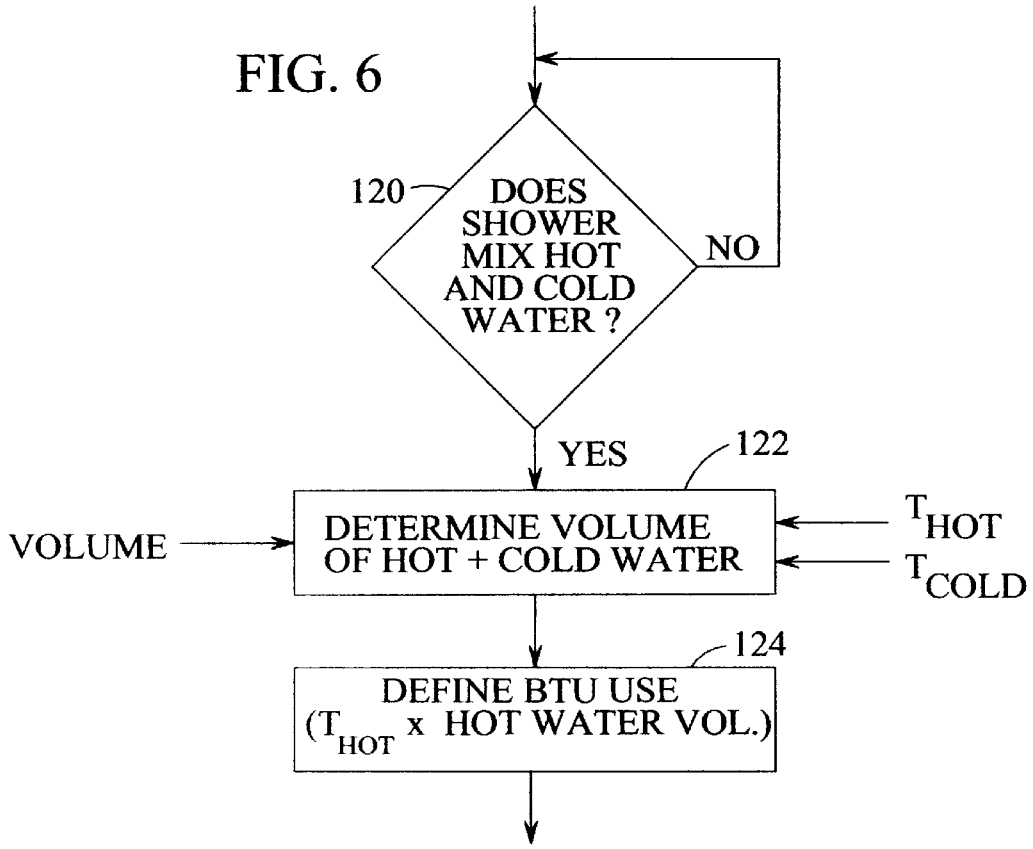
FIG. 6 is a flow chart illustrating how BTU use can be determined after cold and hot water have been mixed.

The computer, as shown in FIG. 6, computes the flow of both hot and cold water by solving two equations as follows:

$$Ax+By=Cz$$

$$A+B=C$$

x=temperature of cold water (known);
y=temperature of hot water (known);
z=temperature of mixed water (measure);
A=flow of cold water;
B=flow of hot water;
C=flow of mixed water (measured). The flow volume from each hot and cold water feed allows a building owner to bill for each source of water at a separate rate, recognizing the higher cost to provide hot water. The control determines whether mixing takes place (step 120) and receives information concerning the hot and cold water temperatures (T hot, T cold) from other monitors in the unit (the cold water temperature could also be set to reflect the cold water temperature) and determines the volume of hot and cold water that has been mixed (step 122). The control then computes the BTU use by multiplying the volume of hot water by the temperature difference between the hot and cold water or the relative temperature difference of each to a defined temperature (step 124).

Figure 7:
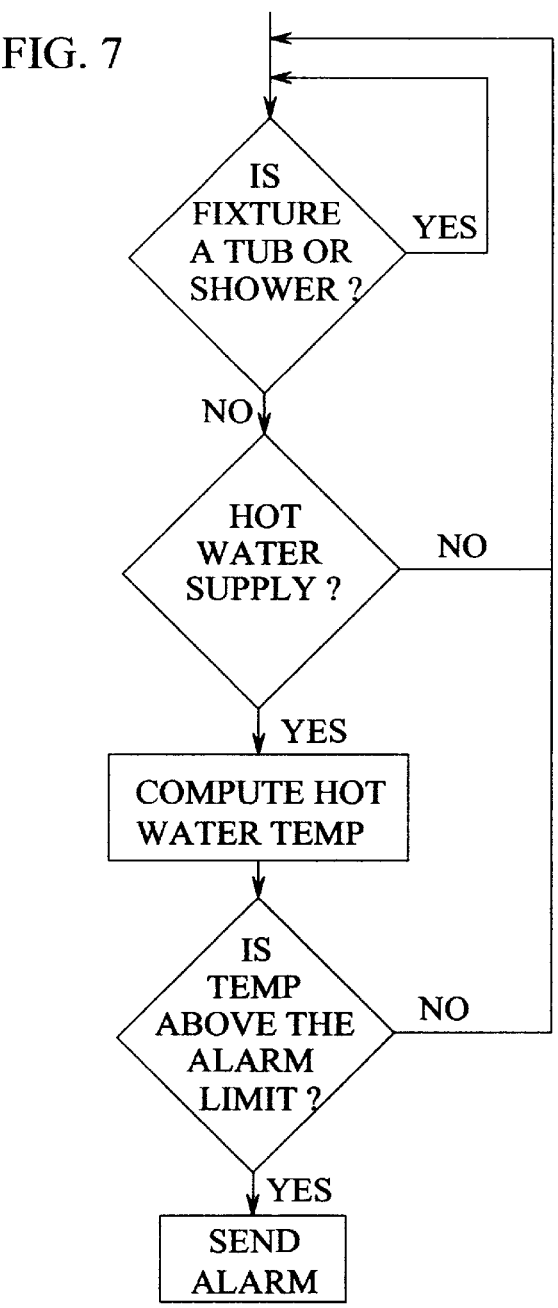
FIG. 7 is a flow chart illustrating how a too high temperature setting for the hot water supply can be determined.

The computer, as shown in FIG. 7, also computes the total BTU use/the total volume of hot water flow (this could also be for an individual device or select group of devices) step 126 and compares this ratio to a standard step (127) and sends an alarm in the event that the actual ratio exceeds the standard which in turn indicates excessively hot water step (128). The control, as shown in FIG. 7, determines if the hot water temperature exceeds a defined limit which is set to protect occupants from the risk of scalding. If the measured hot water temperature exceeds a user defined limit, an alarm is sent indicating the need for repair or adjustment.

Figure 8:
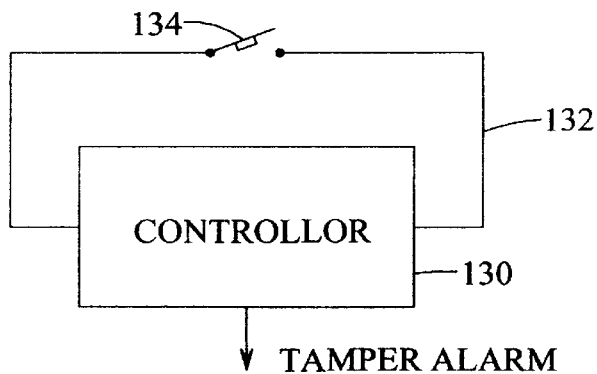
FIG. 8 is a schematic showing of the control circuit for issuing a signal indicating that a person has tampered with the monitor.

Since the meter may have a rotating metallic target (including a metallic substance) which is sensed by a sensor, the system can be inhibited by attaching a magnet to the monitor. As shown in FIG. 8, the computer in the monitor 130 has a circuit 132 which is controlled by a magnetic reed switch 134. Should a magnet be attached to the monitor, the magnetic reed switch 134 will close thereby supplying a signal to the monitor computer. In response to this signal the monitor will transmit a tamper alarm when it transmits data to the receiver.

We claim:

1. A system for monitoring the use of water supplied by a pipe to a device that discharge water during use comprising
   a meter for generating information indicating that water is flowing through the pipe,
   a computer for receiving said information and determining that the water is flowing through the pipe and that water has stopped flowing through the pipe,
   said computer further including
      an event counter,
      means for identifying an event defined by the flow of water through the pipe followed by the stoppage of water flow in the pipe for at least a predetermined duration of time, and
      means for updating said event counter when an event is identified.

2. A system for monitoring the use of water in a device that discharges water during use according to claim 1, further comprising means for comparing the actual number of events counted in a selected period of time with a predetermined event range for that selected period of time and issuing a signal indicating that said actual number of events falls outside of said predetermined events range.

3. A system for monitoring the use of water in a device that discharges water during use according to claim 2, wherein said signal indicates that the water using device is operating improperly.

4. A system for monitoring the use of water in a device that discharges water during use according to claim 1, further comprising means for computing
   the volume of water discharged from the water using device during a selected period of time,
   the number of events that have occurred during said selected period of time, and the actual volume of water discharged from the water using device per event.

5. A system for monitoring the use of water in a device that discharges water during use according to claim 4, further comprising means for comparing the actual volume of water discharged from the water using device per event with an ideal range of volume of water discharged from the water using device per event and issuing a signal in the event the actual volume of water discharged from the water using device per event falls outside of the ideal range of volume of water discharged from the water using device per event.

6. A system for monitoring the use of water in a device that discharges water during use according to claim 1, wherein said device is a shower head which drains after use and wherein said control further comprises means for computing the volume of water discharged from the water using device during a selected period of time from said data generated by said meter, the number of events that have occurred during said selected period of time, and a correction for the computed volume of water by multiplying said total number of events by an empirically set value.

7. A system for monitoring the use of water in a device that discharges water during use comprising a meter for generating information indicating that water is flowing through the pipe including a rotatable device having a metallic target and a sensor for sensing said metallic target as it rotates past said sensor, a computer for receiving said information and determining that the water is flowing through the water pipe and that water has stopped flowing through the water pipe, means for supplying said computer with a tamper signal in the event a magnet is secured to said meter to stop the operation of said meter including a computer input line having a magnetically operable reed switch.

8. A system for monitoring the use of water supplied by at least one pipe to one or more devices that discharge water during use in an apartment unit comprising a meter for each of said pipes for generating information indicating that water is flowing through the pipe, means for determining the total volume of water which has flowed through said at least one pipe, means for determining the BTU content of said determined total volume of water, and means for computing the hot water temperature of said BTU content and comparing the computed temperature to a user defined limit and issuing an alarm if the actual temperature exceeds the user defined limit.

* * * * *